United States Patent
Sankaran et al.

(10) Patent No.: US 12,099,841 B2
(45) Date of Patent: Sep. 24, 2024

(54) USER TIMER DIRECTLY PROGRAMMED BY APPLICATION

(71) Applicant: Intel Corporation, Santa Clara, CA (US)

(72) Inventors: Rajesh Sankaran, Portland, OR (US); Gilbert Neiger, Portland, OR (US); Vedvyas Shanbhogue, Austin, TX (US); David Koufaty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 17/212,977

(22) Filed: Mar. 25, 2021

(65) Prior Publication Data
US 2022/0147393 A1    May 12, 2022

Related U.S. Application Data

(60) Provisional application No. 63/113,106, filed on Nov. 12, 2020.

(51) Int. Cl.
  *G06F 9/54* (2006.01)
  *G06F 9/30* (2018.01)
  *G06F 9/48* (2006.01)
(52) U.S. Cl.
  CPC ...... *G06F 9/30076* (2013.01); *G06F 9/30101* (2013.01); *G06F 9/4825* (2013.01)
(58) Field of Classification Search
  None
  See application file for complete search history.

(56) References Cited

U.S. PATENT DOCUMENTS

| | | | |
|---|---|---|---|
| 5,148,544 A | 9/1992 | Cutler et al. | |
| 6,179,489 B1* | 1/2001 | So | G06F 9/544 |
| | | | 718/102 |
| 8,327,187 B1* | 12/2012 | Metcalf | H04L 49/109 |
| | | | 714/10 |
| 10,924,096 B1* | 2/2021 | Modi | G06F 1/10 |
| 2008/0151884 A1* | 6/2008 | Elberbaum | H04L 65/70 |
| | | | 370/389 |
| 2014/0331075 A1* | 11/2014 | Morris | G06F 1/04 |
| | | | 713/502 |

(Continued)

OTHER PUBLICATIONS

Irina Fedotova, Implementation of a unified user-space time handling library under the Linux OS, Sep. 13, 2012 (Year: 2012).*

(Continued)

*Primary Examiner* — Hyun Nam
(74) *Attorney, Agent, or Firm* — Essential Patents Group, LLP

(57) ABSTRACT

An embodiment of an apparatus comprises decode circuitry to decode a single instruction, the single instruction to include a field for an identifier of a first source operand, a field for an identifier of a destination operand, and a field for an opcode, the opcode to indicate execution circuitry is to program a user timer, and execution circuitry to execute the decoded instruction according to the opcode to retrieve timer program information from a location indicated by the first source operand, and program a user timer indicated by the destination operand based on the retrieved timer program information. Other embodiments are disclosed and claimed.

21 Claims, 17 Drawing Sheets

(56) References Cited

U.S. PATENT DOCUMENTS

| | | |
|---|---|---|
| 2018/0246827 A1 | 8/2018 | Neiger et al. |
| 2020/0264997 A1 | 8/2020 | Neiger et al. |
| 2022/0318169 A1* | 10/2022 | Venkataramani ....... G06F 13/22 |
| 2024/0054939 A1* | 2/2024 | Kim ........................ G06F 3/013 |

OTHER PUBLICATIONS

Kaffes, Kostis et al., "Shinjuku: Preemptive Scheduling for μsecond-scale Tail Latency", Proceedings of the 16th USENIX Symposium on Networked Systems Design and Implementation (NSDI '19), Feb. 26-28, 2019, 16 pgs.

Extended European Search Report from European Patent Application No. 21194806.2 notified Mar. 2, 2022, 10 pgs.

\* cited by examiner

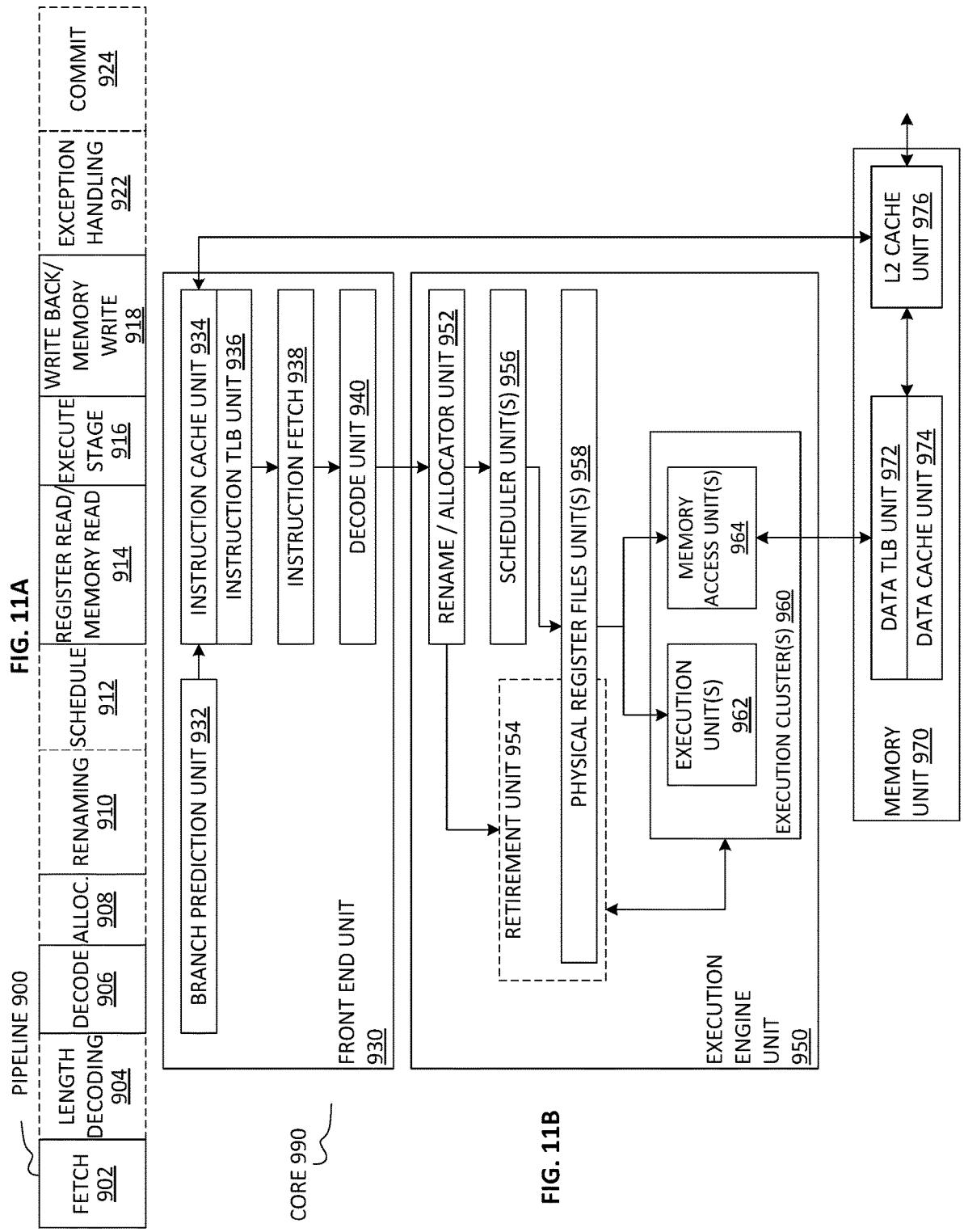

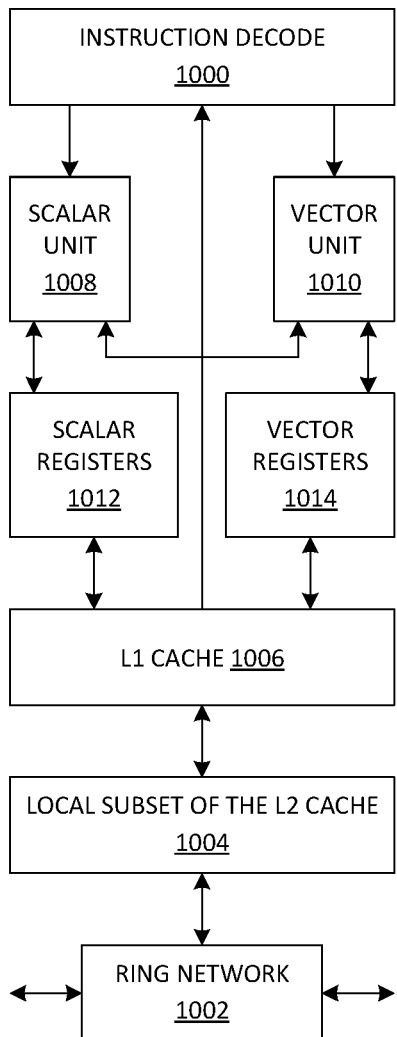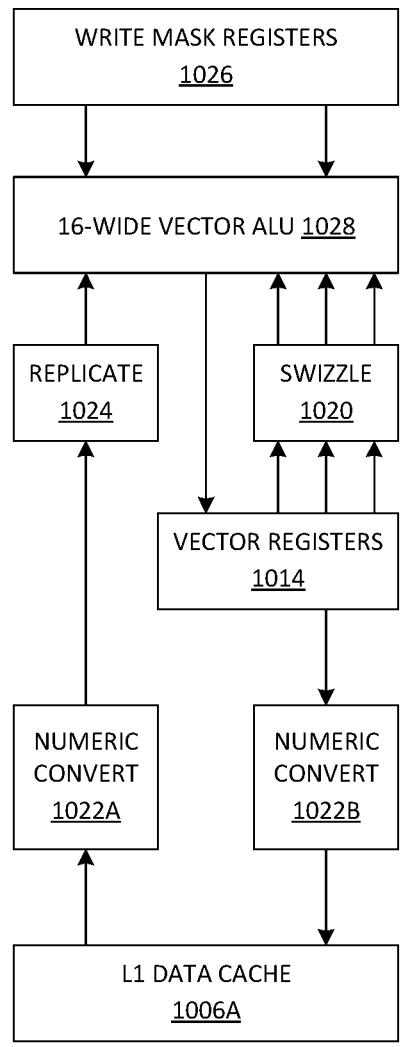
FIG. 12A
FIG. 12B

USER TIMER DIRECTLY PROGRAMMED BY APPLICATION

CLAIM FOR PRIORITY

This application claims priority to U.S. Provisional Patent Application No. 63/113,106, filed Nov. 12, 2020 and titled "USER TIMER DIRECTLY PROGRAMMED BY APPLICATION," which is incorporated by references in its entirety for all purposes.

BACKGROUND

1. Technical Field

This disclosure generally relates to processor technology, and timer technology.

2. Background Art

Applications often require a timer service to schedule certain functions at a future point in time. Two usage categories for of a timer service include blocking and non-blocking. In a blocking usage, the application suspends execution until the timer event occurs. Blocking usages typically occur when the application is idle and needs to wait for the event to resume execution, thereby saving power and potentially allowing other tasks to run. In a non-blocking usage, the application continues execution and gets notification of the timer event through some asynchronous mechanism.

BRIEF DESCRIPTION OF THE DRAWINGS

The various embodiments of the present invention are illustrated by way of example, and not by way of limitation, in the figures of the accompanying drawings and in which:

FIG. 11A is a block diagram illustrating both an exemplary in-order pipeline and an exemplary register renaming, out-of-order issue/execution pipeline according to embodiments of the invention.

FIG. 11B is a block diagram illustrating both an exemplary embodiment of an in-order architecture core and an exemplary register renaming, out-of-order issue/execution architecture core to be included in a processor according to embodiments of the invention;

FIGS. 12A-B illustrate a block diagram of a more specific exemplary in-order core architecture, which core would be one of several logic blocks (including other cores of the same type and/or different types) in a chip;

DETAILED DESCRIPTION

Figure 1:
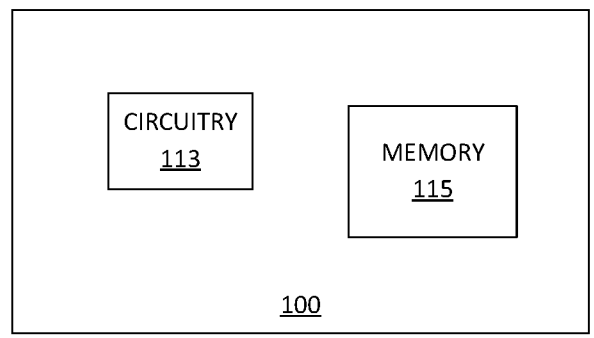
FIG. 1 is a block diagram of an example of an integrated circuit according to an embodiment.

Embodiments discussed herein variously provide techniques and mechanisms for a user timer. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide a user timer programmed directly by an application.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for a user timer. Some embodiments may address one or more shortcomings of conventional timers, primarily for a non-blocking usage. Some embodiments may target usages including, for example, better preemption and fairness in programming languages that support user-level threads, better scheduling and preemption support for host networking stacks in user space, and/or reduced tail latencies for cloud workloads at-scale.

Hardware support for timers is available in most or all conventional platforms. In the IA32 architecture, for example, both an advanced programmable interrupt controller (APIC) timer and a high precision event timer (HPET) provide this capability. Other hardware timers include a multimedia (MM) timer, a programmable interval timer (PIT), a real-time clock (RTC) timer, etc. However, because the timer events are delivered through interrupts and the timers need to be shared across many applications, operating systems (OSs) typically retain programming and handling of the hardware timer, multiplexing many timer events into a single hardware unit by programming the earliest timer event required among the outstanding requests.

In the conventional model, applications are required to make a system call to set up a timer event (e.g., POSIX timer_create and timer_settime). After the timer expires, the OS handler will determine if the event belongs to any application and eventually deliver the event to the application, typically by either unblocking an application thread that may be waiting for the event or by injecting the event asynchronously in the applications through the use of signals. The asynchronous event delivery through the signal handler allows applications to switch execution to the function that required delayed execution.

The performance of conventional hardware timers may be challenged by kernel overheads. A timer setup overhead may involve system calls to set up the timers that these calls can last at least a few hundred nanoseconds. If, however, the timer is periodic (e.g., if the timer needs to be armed at fixed granularity), a single system call may be used which will significantly amortize its cost. Event delivery overhead, as previously discussed, includes where the hardware timer event is delivered to the OS, which then determines which thread is awaiting the event and eventually delivers the event. In a conventional system, the event delivery overhead may take at least several microseconds on average, and it is not uncommon for the event delivery to suffer from significant jitter due to other unrelated events and system activity that may delay it, resulting in significant deviations from the timer expiration of tens of microseconds or more.

These overheads may not be tolerable to software when the granularity of the timer is small. For example, a 5-microsecond timer that incurs a 2 microsecond setup and event delivery overhead would waste 20% of processor cycles of these timekeeping activities, reducing throughput for a loaded system. The overhead makes this approach prohibitive, for example, in preemptive scheduling. In addition, the jitter associated with kernel delivery may be significant. For example, a 10-microsecond timer can be delivered in as many as two times (2×) to 3 times (3×) as many microseconds (e.g., 20 to 30 microseconds), reducing the benefit of the desired fine-grain timer.

Advantageously, some embodiments may provide technology for a user timer capability that can be programmed by applications directly with minimal operating system support. While the operating system may enable the user timer capability and provide context switch support for the associated state, applications can directly arm the user timer using novel instructions and receive a user timer event through the delivery of a user interrupt. For example, the availability of embodiments of a user timer feature may be described in an architecture specification. An instruction set architecture may describe the instruction(s) that applications may use to set up a timer, as well as the operating system support utilized to set up the delivery of interrupts and enabling the feature.

Advantageously, applications that require a fine-granularity user timer will minimize the overhead associated with setting up the timer and delivery of the timer event by bypassing the kernel in the critical path for both timer setup and event delivery. Because the kernel is bypassed, the jitter of the timer event may also be reduced. Some embodiments may benefit multiple software stacks including, for example, better preemption and fairness in programming languages and runtimes that support user-level threads, better scheduling and preemption support for host networking stacks in user space, and reduced tail latencies for cloud workloads at-scale.

Some embodiments may move more functionality associated with a hardware timer into user space. Some embodiments may provide better performance and lower latency, and avoid kernel overheads. Some embodiments may provide higher level abstractions that are independent of underlying OS interfaces. For example, some embodiments may apply application-specific policies that do not depend on OS capabilities and policies, and/or avoid a lengthy development and release cycle for kernel-based features.

Other examples of features that add hardware support for kernel bypass for the data plane include direct delivery of interrupts to applications (e.g., user interrupts) and fast user mode synchronization (user-inter-processor interrupt (user-IPI)). These two features allow applications to directly service external device interrupts as well as other processor interrupts. Some embodiments provide hardware support for kernel bypass for a user timer that allows applications to program and receive timer events directly.

With reference to FIG. 1, an embodiment of an integrated circuit 100 may include circuitry 113 configured to retrieve timer program information provided directly from a user-level application, and program a user timer in hardware based on the retrieved timer program information. For example, the circuitry 113 may be configured to arm the user timer based on the retrieved timer program information, and/or to schedule a user interrupt to deliver a user timer event directly to the user-level application. Advantageously, embodiments of the circuitry 113 may be configured to bypass a kernel to setup the user timer, and bypass the kernel to deliver a user timer event to the user-level application.

In some embodiments, the integrated circuit 100 may further comprise memory 115 communicatively coupled to the circuitry 113 to store the timer program information for the user timer. For example, the memory 115 may comprise a register, and the timer program information may indicate a desired amount of time delay or a desired time deadline. In some embodiments, the circuitry 113 may be further configured to arm the user timer based on the timer program information stored in the memory 115, determine if a programmed time is reached for the user timer, and, if so determined, pend a user timer event for the user timer (e.g., cause the user timer event to become pending). The circuitry 113 may also be configured to schedule a user interrupt with a user timer vector to deliver the user timer event to the user-level application.

Figure 2A:
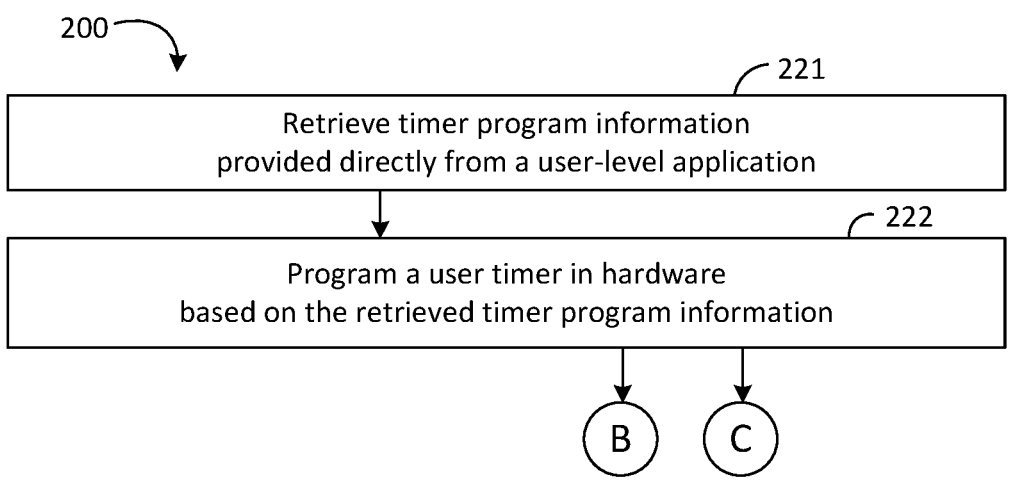
FIGS. 2A to 2C are flow diagrams of an example of a method according to an embodiment.
Figure 2B:
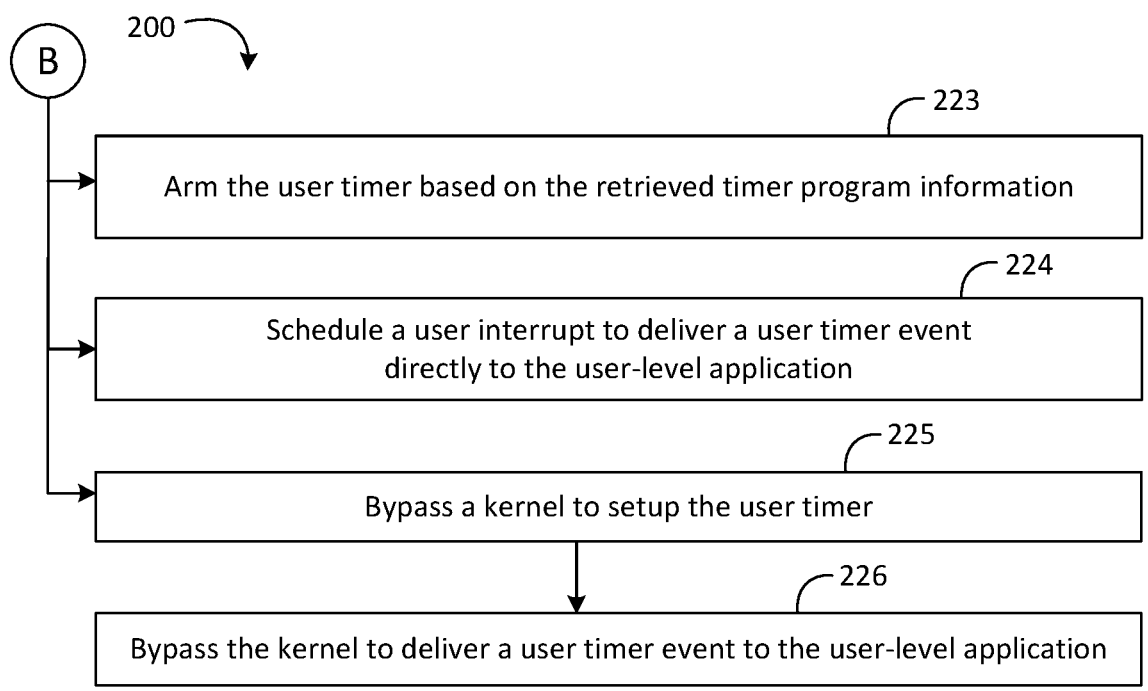
Figure 2C:
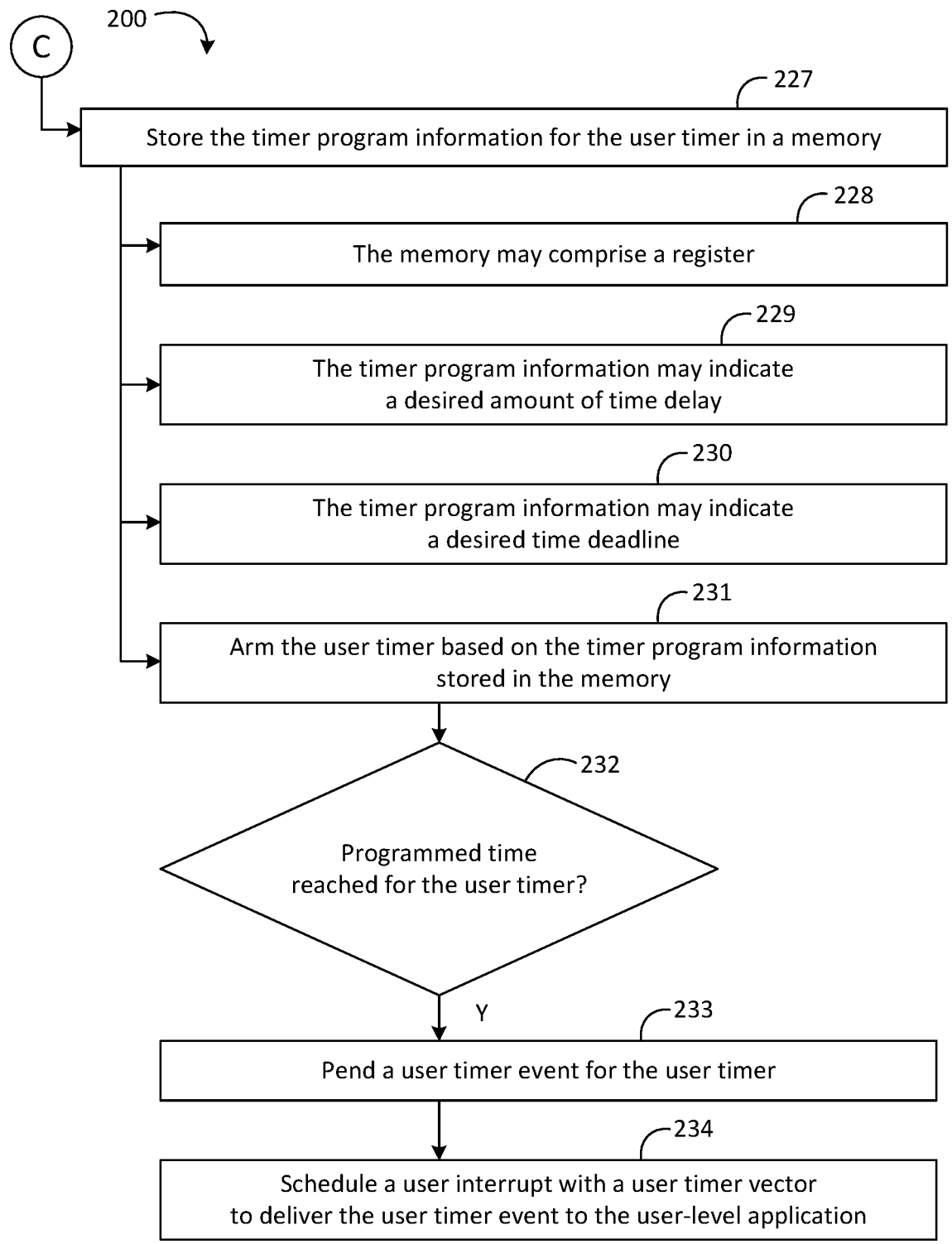

With reference to FIGS. 2A to 2C, an embodiment of a method 200 may include retrieving timer program information provided directly from a user-level application at box 221, and programming a user timer in hardware based on the retrieved timer program information at box 222. For example, the method 200 may include arming the user timer based on the retrieved timer program information at box 223, and/or scheduling a user interrupt to deliver a user timer event directly to the user-level application at box 224. Advantageously, some embodiments of the method 200 may include bypassing a kernel to setup the user timer at box 225, and bypassing the kernel to deliver a user timer event to the user-level application at box 226.

Some embodiments of the method 200 may further include storing the timer program information for the user timer in a memory at box 227. For example, the memory may comprise a register at box 228, and the timer program information may indicate a desired amount of time delay at box 229, or a desired time deadline at box 230. The method 200 may also include arming the user timer based on the timer program information stored in the memory at box 231, determining if a programmed time is reached for the user timer at box 232, and, if so determined, pending a user timer event for the user timer at box 233. Some embodiments of the method 200 may further include scheduling a user interrupt with a user timer vector to deliver the user timer event to the user-level application at box 234.

Figure 3:
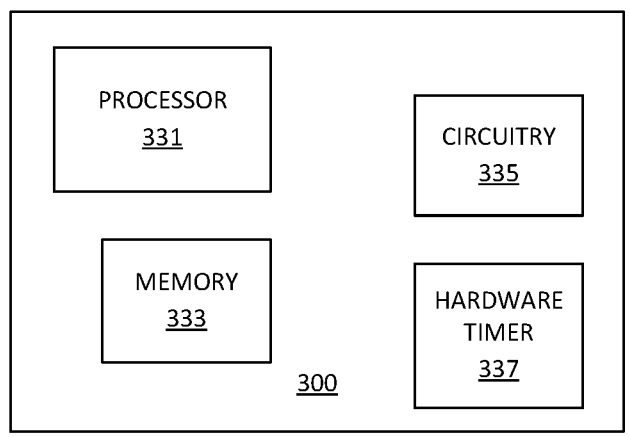
FIG. 3 is a block diagram of an example of an apparatus according to an embodiment.

With reference to FIG. 3, an embodiment of an apparatus 300 may include a processor 331, memory 333 communicatively coupled to the processor 331 to store timer program information provided directly from a user-level application, and circuitry 335 communicatively coupled to the processor 331 and the memory 333. The circuitry 335 may be configured to retrieve the timer program information from the memory 333, and program a user timer in hardware based on the retrieved timer program information. For example, the circuitry 335 may be further configured to arm the user timer based on the retrieved timer program information, and/or to schedule a user interrupt at the kernel-level to deliver a user timer event directly to the user-level application. The circuitry may also be configured to bypass a kernel to setup the user timer, and bypass the kernel to deliver a user timer event to the user-level application.

Some embodiments of the apparatus 300 may further comprise a hardware timer 337 for use as a reference for the user timer. For example, the hardware timer 337 may comprise a reference clock, and the timer program information may indicate a number of cycles of the reference clock or a clock deadline value for the reference clock. In some embodiments, the circuitry 335 may be further configured to arm the user timer based on the clock deadline value stored in the memory, determine if the reference clock reached the clock deadline value, and, if so determined, pend a user timer event for the user timer. The circuitry 335 may also be configured to schedule a user interrupt with a user timer vector to deliver the user timer event to the user-level application.

Figure 4:
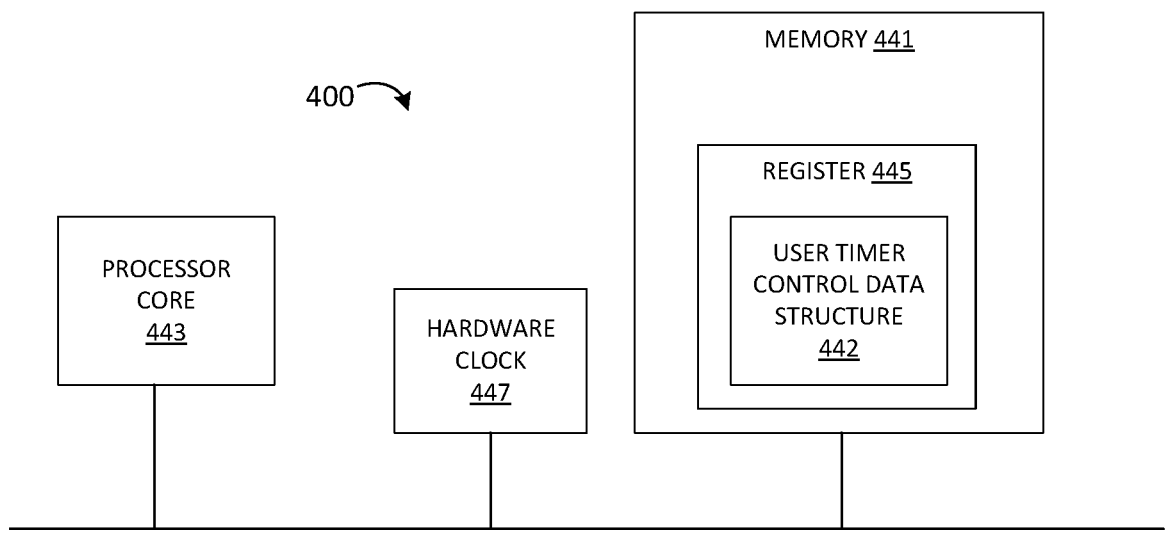
FIG. 4 is a block diagram of an example of a processing system according to an embodiment.

With reference to FIG. 4, an embodiment of a system 400 may include a memory 441 to store a user timer control data structure 442 associated with a user-level application, and a processor core 443 communicatively coupled to the memory 441 to program a user timer based on a time value stored in the user timer control data structure 442, determine if a reference clock has reached a user timer value, and, if so determined, set an indication that the user timer event is pending for the user timer. For example, the memory 441 comprises a register 445 to store the user timer control data structure 442. In some embodiments, the processor core 443 may be further configured to decode a user deadline and a user timer vector from the user timer control data structure 442. In some embodiments, the processor core 443 may also be configured to schedule a user interrupt to deliver the user timer event to the user-level application. For example, the processor core 443 may be configured to set a bit in a bitmap of user interrupts currently requesting service that corresponds to the user timer vector, and set a user deadline for the user interrupt to zero. Other embodiments may utilize technology other than user interrupts to deliver the user timer event to the user-level application.

Some embodiments of the system 400 may further comprise a hardware clock 447 for use as the reference clock for the user timer. In some embodiments, the processor core 443 may be configured to set the indication that the user timer event is pending for the user timer when a number of cycles of the reference clock that have elapsed after the user timer is programmed corresponds to the time value stored in the user timer control data structure 442. Additionally, or alternatively, the processor core 443 may be further configured to set the indication that the user timer event is pending for the user timer after the reference clock reaches a clock value that corresponds to the time value stored in the user timer control data structure 442.

In some embodiments, a user timer feature may define a 64-bit value that encodes the desired time for a user timer event. Software arms the timer by writing this value into a register. When the programmed time is reached, the user timer event becomes pending. When processed, a user timer event results in a user interrupt with a user timer vector.

TIMER ARMING EXAMPLES

In accordance with some embodiments, applications can arm the timer and specify the user interrupt vector directly (bypassing the kernel) using ring 3 (user-level) instructions. Embodiments may support these instructions in multiple ways, including, for example, dedicated instructions that read and write a register (TMR) associated with the user timer feature (e.g. RDTMR, WRTMR), and generic instructions that read and write user control registers (UCR) in general, which include the user timer registers (e.g., RDUCR, WRUCR)

In accordance with some embodiments, software can specify the time associated with the user timer in several ways, including a delay-based approach and a deadline-based approach. For the delay-based approach, the user timer becomes pending after a number of cycles of a reference clock (e.g., the processor timestamp counter (TSC)), which corresponds to the delay. Setting the delay to zero would disable the timer. Optionally, hardware may support a periodic timer sub-mode in which the timer is rearmed after the delay has elapsed and a user timer event is delivered.

For the deadline-based approach, the timer becomes pending when the reference clock (e.g., the processor TSC) reaches a particular value, which corresponds to the deadline. Setting the user deadline to zero would disable the timer. In this mode, software is responsible for rearming the timer after the user timer event is delivered.

For purposes of illustration and not limitation (e.g., and without loss of generality), operation of the user timer for the following examples is described using the TSC as the reference clock for a deadline-based approach. When the TSC value reaches the deadline, the user timer event becomes pending. After the user timer event is processed, the user timer event will be delivered using a user interrupt with a user timer vector chosen by software. The user timer vector chosen by software may be specified in the same register as the deadline or in a different register.

Figure 5:
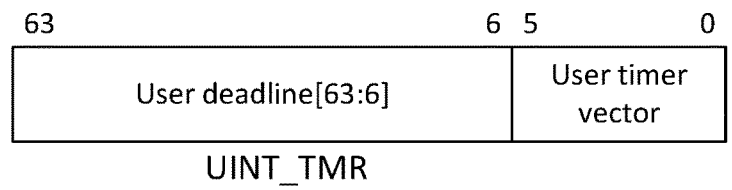
FIG. 5 is an illustrative diagram of an example of a user timer control data structure according to an embodiment.

FIG. 5 illustrates an example format of a user timer control data structure using a single register (e.g., referred to herein as UINT_TMR) that encodes both a user deadline and a user timer vector. In this example, the user deadline is specified with a granularity of 64 TSC cycles, with the lower 6 bits assumed to be zero.

EVENT DELIVERY EXAMPLES

The user timer event becomes pending when the logical processor TSC is greater than or equal to the user deadline. Setting the user deadline to a value in the past will pend a user timer event upon completion of the write. Writing zero to the user deadline disables the user timer and cancels a pending user timer event.

Pending user timer events are not processed until the processor is in ring 3 (e.g., current privilege level (CPL)=3). Note that the event is held pending during operating system context switches, system calls, servicing of interrupts or faults, etc. Other conditions may be required to process the pending user timer events, including that user interrupts may be enabled (e.g., update interrupt flag (UIF)=1).

When the user timer event is processed, a user interrupt is pended by setting the bit corresponding to the user timer vector in the bitmap of user interrupts currently requesting service (e.g., a user interrupt request register (UIRR)) and then setting the user deadline to zero. The user interrupt may be delivered immediately after processing.

OS SUPPORT EXAMPLES

In accordance with some embodiments, support for the user timer capability may be enumerated through the addition of dedicated capability bits. For example, the dedicated capability bits may be enumerated by hardware through additional capability bits in a CPUID instruction. In some embodiments, the user timer capability may be available only in certain processor modes (e.g. in 64-bit operation).

In some embodiments, a user timer feature may be enabled by system software using specific enabling bits in general or dedicated registers (e.g., in CR4 or in an architectural model-specific register (MSR)). Optionally, the availability of the instruction support for the user timer may be conditioned on software having enabled the feature. For example, the instructions for using the user timer may trigger a fault when the user timer is not enabled.

In some embodiments, hardware may provide an extension to allow fast save/restore of the state associated with the user time. For example, hardware may provide an extension to the XSAVE/XSTORE architecture for a new state component associated with user timer, and/or specific instructions to save/restore a list of registers (e.g., including those registers associated with user timer).

In accordance with some embodiments, operating systems may manage the user time in any of a variety of ways. For example, the OS may choose to enable only one mode or provide an API to allow applications to select the mode it needs. Two example state management policies include a global timer mode and a virtual timer mode.

For the global timer mode, the operating system preserves the user programming on context switch. For a deadline-based timer, operation would be as follows: 1) when a user thread is descheduled, its deadline is saved away; 2) when the thread is rescheduled, that same deadline is restored; and 3) if deadline passed while the thread is descheduled, the thread would get a user timer event delivered through a user interrupt immediately upon being rescheduled.

For the virtual timer mode, the operating system adjusts the user programming on context switch. For a deadline-based timer, operation would be as follows: 1) when a user thread is descheduled, delta between its deadline and TSC is saved away; 2) when the thread is rescheduled, its deadline is restored with the sum of current TSC and saved delta. In this mode, the thread gets a deadline that is continuously adjusted by the time it is not running.

Figure 6A:
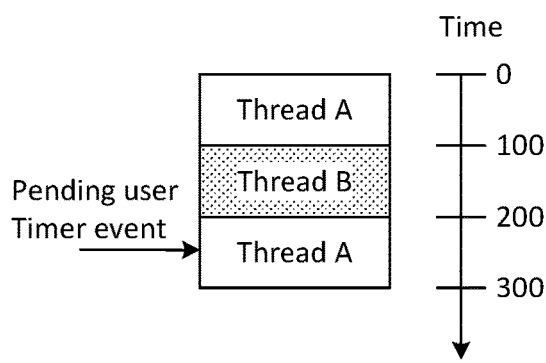
FIGS. 6A and 6B are illustrative timelines of examples of a global timer and a virtual timer according to embodiments.
Figure 6B:
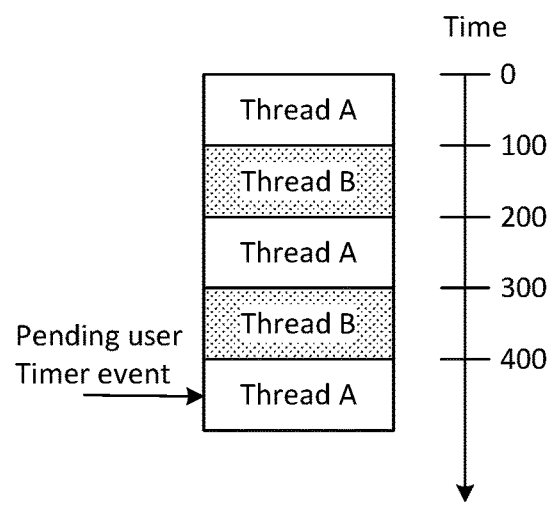

FIGS. 6A and 6B illustrate a comparison between a global (FIG. 6A) and virtual (FIG. 6B) timer when a thread sets a timer of 250 microseconds at time 0.

USER INTERRUPT EXAMPLES

Any suitable technology may be utilized to provide user-level interrupts. For example, a processing system (e.g., a single-core or a multi-core processor) may include processing logic designed to support an event, which may be referred to as a user-level interrupt. Unlike an ordinary interrupt, a user-level interrupt is delivered to a corresponding user-level application without privilege level transitions, and may only be delivered when such an application is being executed.

A user-level interrupt event may invoke a CPU control flow modification mechanism, which may be referred to as user-level interrupt delivery. In some implementations, user-level interrupt delivery may be triggered based on the processor state (e.g., when a certain user-level application is being executed) and by the state of certain memory data structures that may be collaboratively managed by the processor and the operating system. These and other software-configurable mechanisms and data structures may enable the processor to deliver certain I/O interrupts directly to user-level applications without redirecting the control flow to kernel-level software.

In some implementations, a memory data structure, which may be referred to as a user-level APIC, may be collaboratively managed by the processor and the operating system. A separate instance of a user-level APIC may be created for each thread of a user-level application being executed by the processor. The user-level APIC may include a bitmap comprising a plurality of bit flags. Each bit flag may indicate the status of the user-level interrupt identified by the vector corresponding to the position of the bit flag in the bit map. In an illustrative example, the processor may set a bit to indicate that the user-level interrupt identified by the vector corresponding to the position of the bit flag in the bit map is currently pending.

The operating system may further maintain another memory data structure, which may be referred to as a user-level interrupt handler address data structure. A separate instance of a user-level interrupt handler address data structure may be created for each thread of a user-level application being executed by the processor. In certain implementations, the user-level interrupt handler address data structure may be represented by a table comprising a plurality of addresses of user-level interrupt handlers, indexed by the interrupt vector (which, by analogy with an Interrupt Descriptor Table (IDT), may be referred to as a user-level IDT). Alternatively, a single a single user-level interrupt handler address may be stored in a processor register to identify a user-level interrupt handler that would be responsible for all interrupt vectors. In the latter scenario, the user-level interrupt vector may be pushed on the stack of the interrupt handler. For example, a user-level interrupt handler address data structure refers to either the above referenced table comprising a plurality of addresses of user-level interrupt handlers or to the above referenced single user-level interrupt handler address, which may be stored either in one or more processor registers or in the system memory.

Responsive to receiving a notification of a user-level interrupt while a corresponding user-level application is being executed, the processor may notify the application by invoking a user-level interrupt handler identified by the user-level interrupt handler address data structure. When the user-level interrupt handler completes the execution, the control flow may be returned to the software module that was being executed at the time the user-level interrupt was delivered. Thus, the user-level interrupt may be delivered and processed by the user-level application without causing privilege level transitions.

Figure 7:
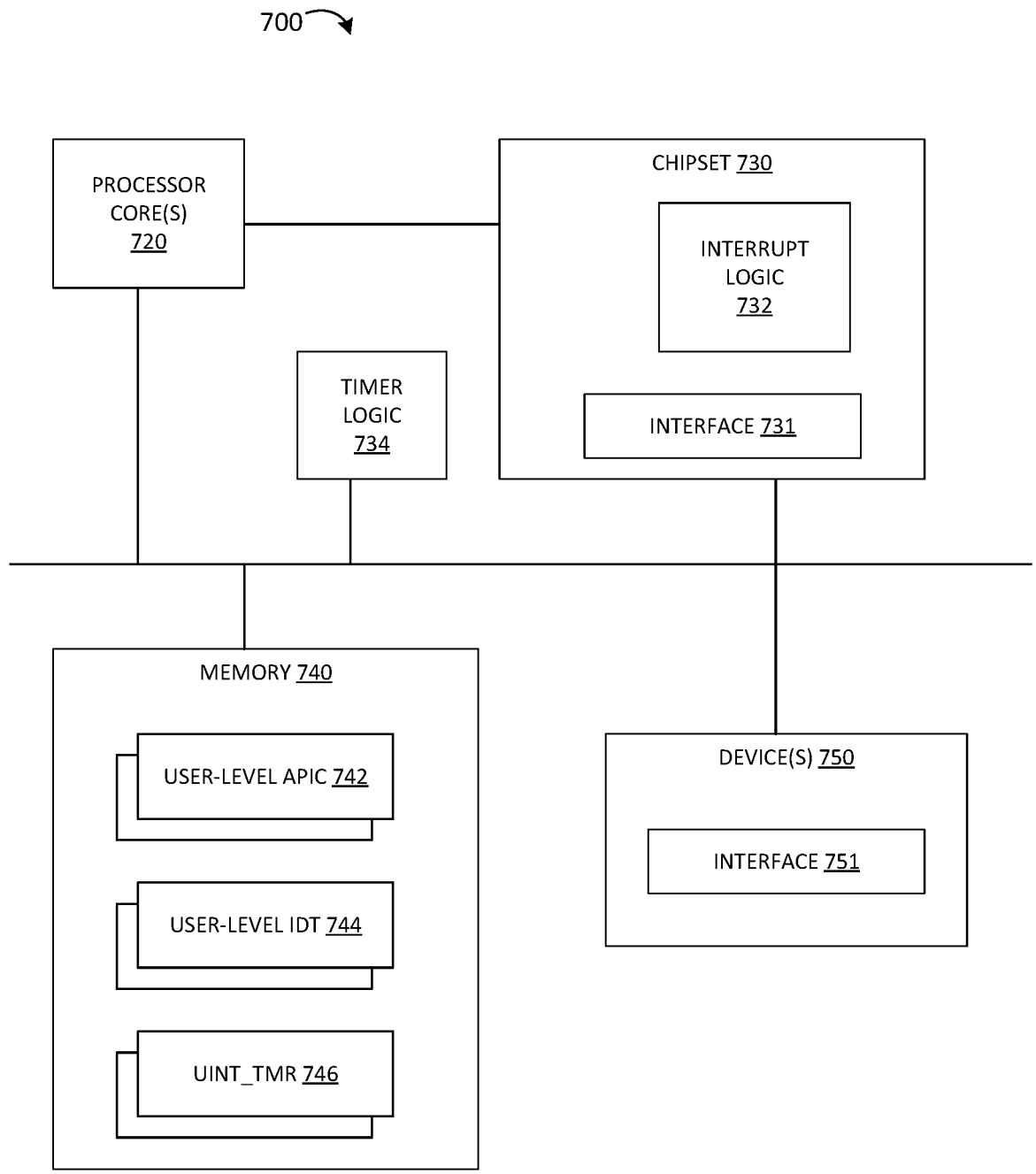
FIG. 7 is a block diagram of another example of a processing system according to an embodiment.

In certain implementations, the processor may prioritize the user-level interrupts (e.g., based on the interrupt vector number). In an illustrative example, responsive to receiving a notification of a user-level interrupt, the processor may set a bit corresponding to the user-level interrupt vector in the user-level APIC associated with the user-level application that is currently being executed by the processor. The processor may then invoke the user-level interrupt handler identified by the user-level interrupt handler address data structure associated with the user-level application, for a pending user-level interrupt having the highest priority among one or more pending user-level interrupts identified by the user-level APIC With reference to FIG. 7, an embodiment of a processing system 700 may include one or more processor cores 720, which may be coupled, via a shared interconnect, to system memory 740. The processing system 700 may further comprise a chipset 730 that supports memory operations, input/ output operations, configuration, control, internal or external interface, connection, or communications functions, and/or other similar functions for the processor cores 720 and/or other components of the processing system 700. Individual elements of the chipset 730 may be grouped together on a single chip, dispersed among multiple chips, and/or be integrated partially, totally, redundantly, or according to a distributed approach into one or more processors, including the processor cores 720.

In certain implementations, the chipset 730 may comprise interrupt logic 732 which may implement user-level interrupt posting. Alternatively, the interrupt logic 732 may reside in other components of the processing system 700. The processing system 700 may further comprise timer logic 734 which may implement user timer features as described herein. In various embodiments, the timer logic 734 may reside in the processor cores 720, the chipset 730, or other components of the processing system 700.

The processing system 700 may further include system memory 740 that may comprise one or more media on which information, such as data and/or program code, may be stored, such as static or dynamic random access memory, semiconductor-based read-only or flash memory, magnetic or optical disk memory, or any other type of medium readable by the processor cores 720.

The processing system 700 may further include one or more devices 750 that may comprise any type of I/O device, peripheral device, or other device that may initiate an interrupt request, such as a keyboard, mouse, trackball, pointing device, monitor, printer, media card, network interface, information storage device, etc. The devices 750 may be embodied in discrete components, or may be integrated with other devices. In certain implementations, a device 750 may represent a function in a multifunctional I/O, peripheral, or other device.

The processor cores 720, chipset 730, system memory 740, and devices 750 may be coupled to each other directly or indirectly through one or more parallel, sequential, pipelined, asynchronous, synchronous, wired, wireless, and/or other bus or point-to-point connection or means of communication. In the illustrative example of FIG. 7, the chipset 730 includes an interface 731 to receive signals, messages, and/or transactions, such as interrupt requests, from the devices 750, or transmit signals, messages, and/or transactions to the devices 750 and/or any other agents or components in system 700, through any such connection or other means of communication. Similarly, the devices 750 may include respective interfaces 751 to transmit and/or receive signals, messages, and/or transactions to the chipset 730, and/or any other agents or components of processing system 700. In certain implementations, the processing system 700 may also include various other components not shown in FIG. 7.

In certain implementations, the system memory 740 may be utilized to store a plurality of user-level APIC data structures 742, a plurality of user-level interrupt handler address data structures 744, and a plurality of user timer control data structures (e.g., UINT_TMRs) 746 associated with a plurality of user-level threads being executed by the processing system 700. Alternatively, the user-level APIC data structures 742, the user-level interrupt handler address data structures 744, and/or the user timer control data structures 746 may be stored in registers of the processor cores 720. The base addresses of the user-level APIC data structure 742, the user-level interrupt handler address data structure 744, and/or the user timer control data structure 746 associated with a given user thread may be stored in the XSAVE area employed by the operating system to load the state on a context switch. In certain implementations, the processor cores 720 may, on a context switch, load the base addresses of the user-level APIC data structure 742, the user-level interrupt handler address data structure 744, and/or the user timer control data structure 746 stored in the XSAVE area into certain processor registers.

Ordinary interrupts are distinguished from each other by their respective unique interrupt types, or interrupt numbers, often referred to as "interrupt vectors." User-level interrupts may share the vector space with ordinary interrupts (so that every interrupt vector identifies either an ordinary interrupt or a user-level interrupt), or they may be allocated a dedicated user-level interrupt vector space. Separating the vector spaces allow independent prioritization of user-level interrupts by each user-level application, thus facilitating dynamic migration of user threads across the processor cores 720.

A processor core 720 may be configured to track pending user-level interrupts using a plurality of user-level APIC data structures 742 associated with a plurality of user-level threads being executed by the processor core 720. Each user-level APIC data structure 742 may include a bitmap comprising plurality of bit flags. The position of each bit flag within the bitmap may correspond to an interrupt number identifying the user-level interrupt type to be processed by the user-level application associated with the user-level APIC data structure. Responsive to receiving a notification of one or more user-level interrupts (e.g., in the form of one or more bits set in the posted interrupt descriptor), the processor may set one or more bits corresponding to the user-level interrupt vectors in the user-level APIC data structure associated with the user-level application that is currently being executed by the processor core 720. The base address of a user thread's user-level APIC data structure may be stored in that thread's XSAVE area. For example, when a user timer event is processed, a user interrupt is pended by setting the bit corresponding to the user timer vector in the bitmap of user interrupts currently requesting service and then setting the user deadline to zero. The user interrupt may be delivered immediately after processing.

Figure 8:
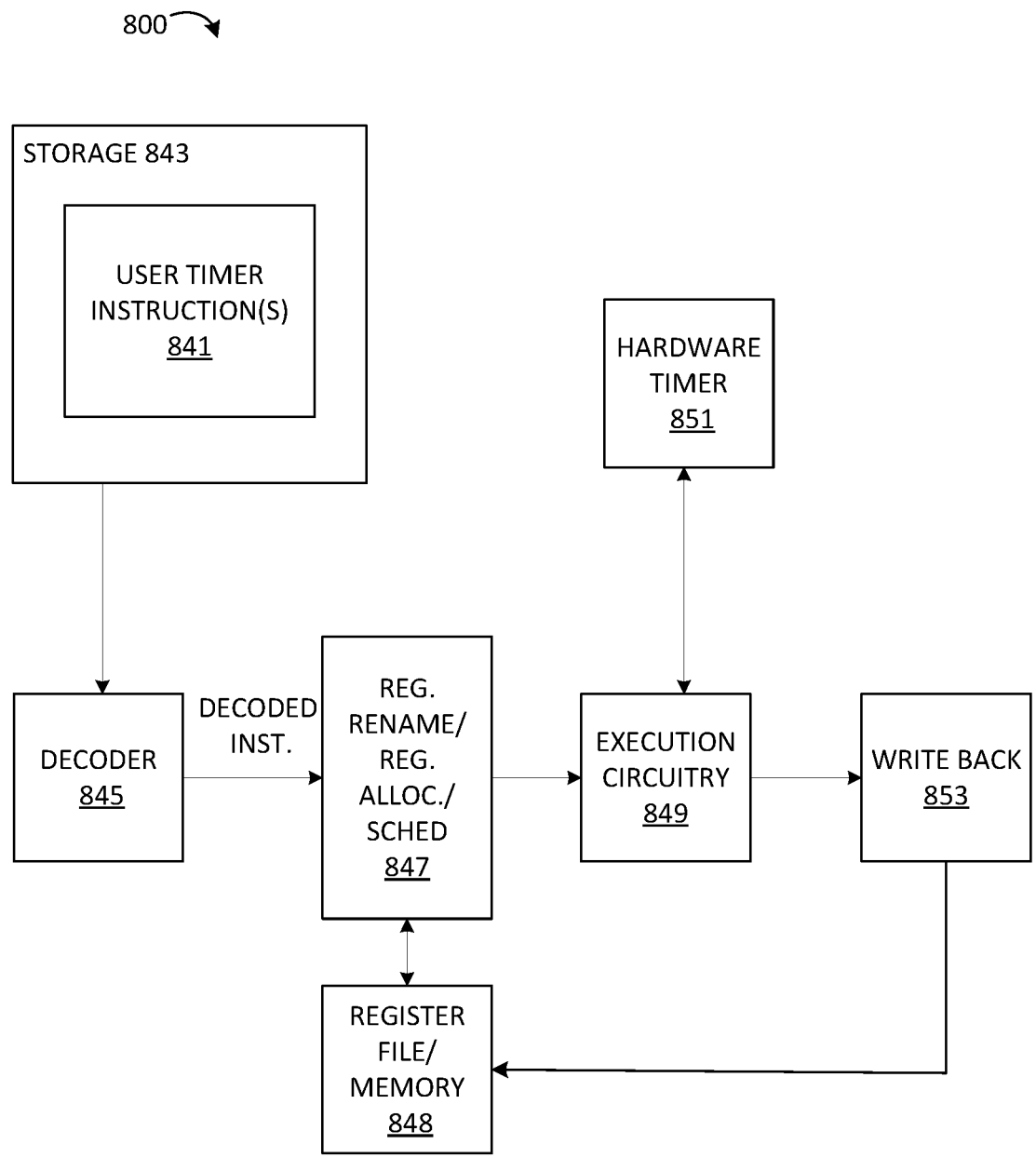
FIG. 8 is a block diagram of an example of hardware according to an embodiment.

FIG. 8 illustrates an embodiment of hardware 800 to process instructions such as user timer instructions (e.g., WRTMR, RDTMR, WRUCR, RDUCR, etc.). As illustrated, storage 843 stores one or more user timer instructions 841 to be executed. Decode circuitry 845 may be configured to decode a single instruction, the single instruction to include a field for an identifier of a first source operand, a field for an identifier of a destination operand, and a field for an opcode, the opcode to indicate execution circuitry is to program a user timer.

One of the user timer instructions 841 is received by decode circuitry 845. For example, the decode circuitry 845 receives this instruction from fetch logic/circuitry. The instruction includes fields for an opcode, a source, and a destination. In some embodiments, the source and destination are registers, and in other embodiments one or more are memory locations. In some embodiments, the opcode details which user timer operation is to be performed.

The decode circuitry 845 decodes the instruction into one or more operations. In some embodiments, this decoding includes generating a plurality of micro-operations to be performed by execution circuitry (such as execution circuitry 849). The decode circuitry 845 also decodes instruction prefixes.

In some embodiments, register renaming, register allocation, and/or scheduling circuitry 847 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 848 store data as operands of the instruction to be operated on by execution circuitry 849. Exemplary register types include packed data registers, general purpose registers, and floating point registers.

Execution circuitry 849 executes the decoded instruction. Exemplary detailed execution circuitry is shown in FIG. 11B, etc. The execution of the decoded instruction causes the execution circuitry 849 to execute the decoded instruction according to the opcode. For some user timer instructions, for example, the execution of the decoded instruction causes the execution circuitry 849 to retrieve timer program information from a location indicated by the first source operand, and program a user timer indicated by the destination operand based on the retrieved timer program information.

In some embodiments, the execution circuitry 849 is further caused to execute the decoded instruction according to the user timer instruction opcode to arm the indicated user timer based on the retrieved timer program information, and/or to bypass a kernel to setup the user timer. In some embodiments, the hardware 800 further includes a hardware timer 851 for use as a reference for the indicated user timer. For example, the hardware timer 851 may comprise a reference clock, and the timer program information may indicate either a number of cycles of the reference clock or a clock deadline value for the reference clock.

In some embodiments, retirement/write back circuitry 853 architecturally commits the destination register into the registers or memory 848 and retires the instruction.

An embodiment of a format for a user timer instruction is WRTMR DSTREG, SRC1. In some embodiments, WRTMR is the opcode mnemonic of the instruction. DSTREG is a field for the destination user register operand. SRC1 is a field for a source operand to indicate a user control register or memory location that stores a user timer control data structure.

Figure 9:
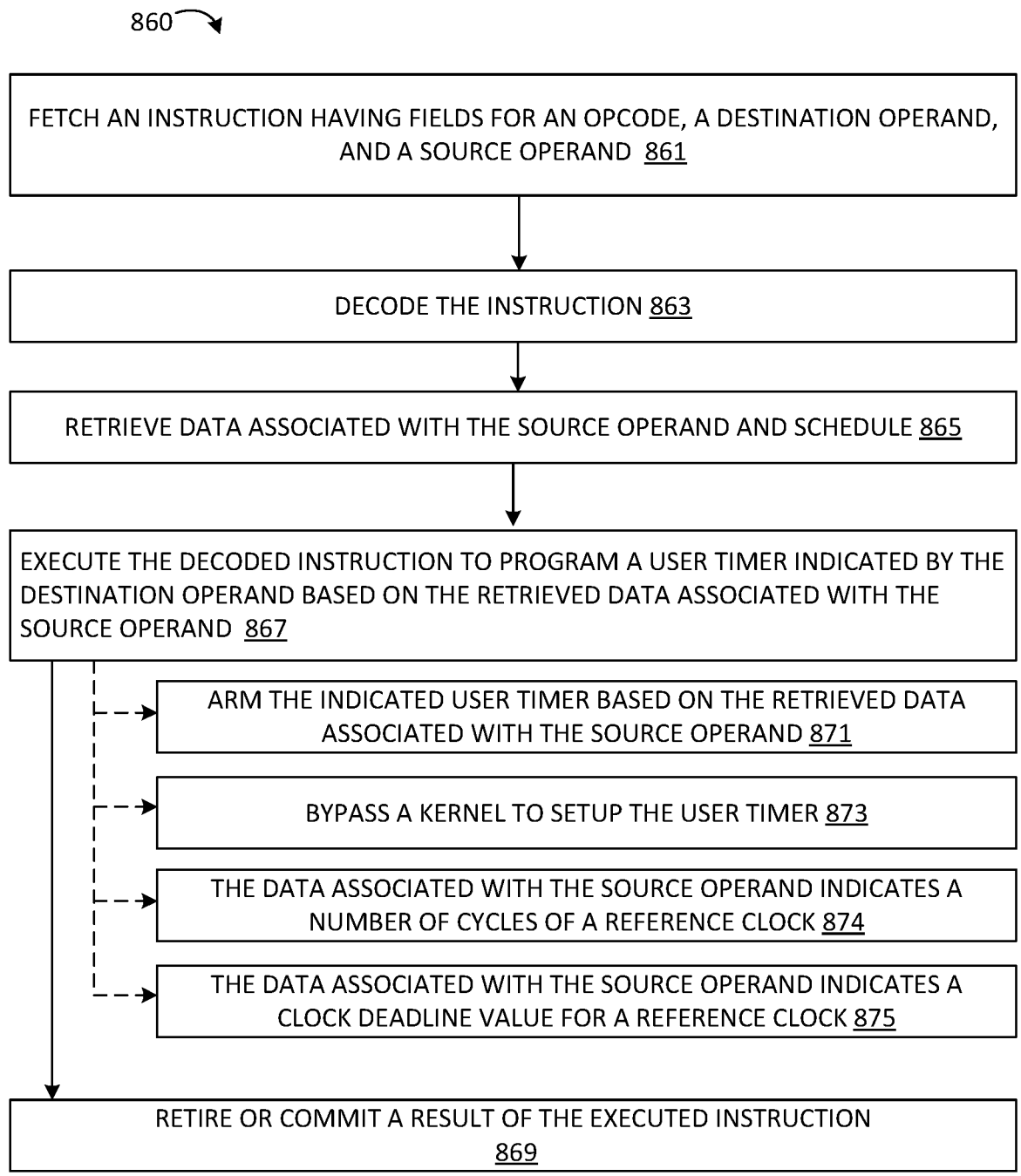
FIG. 9 is a flow diagram of another example of a method according to an embodiment.

FIG. 9 illustrates an embodiment of method 860 performed by a processor to process user timer instructions. For example, a processor core as shown in FIG. 11B, a pipeline as detailed below, etc. performs this method.

At 861, an instruction is fetched. For example, a user timer instruction is fetched. The user timer instruction includes fields for an opcode, a destination operand for the target user timer, and a source operand for a user timer control data structure. In some embodiments, the instruction further includes a field for a writemask. In some embodiments, the instruction is fetched from an instruction cache. The source operands and destination operand are packed data. The opcode of the user timer instruction indicates which user timer operation (e.g., write timer register, read timer register, etc.) to perform.

The fetched instruction is decoded at 863. For example, the fetched user timer instruction is decoded by decode circuitry such as that detailed herein.

Data values associated with the source operands of the decoded instruction are retrieved and execution of the decoded instruction is scheduled at 865. For example, when one or more of the source operands are memory operands, the data from the indicated memory location is retrieved.

At 867, the decoded instruction is executed by execution circuitry (hardware) such as that detailed herein. For the WRTMR instruction, the execution will cause execution circuitry to program a user timer indicated by the destination operand based on the retrieved data associated with the source operand.

In some embodiments, the instruction is committed or retired at 869.

In some embodiments, the execution of the decoded WRTMR instruction will cause execution circuitry to arm the indicated user timer based on the retrieved data associated with the source operand at 871, and/or to bypass a kernel to setup the user timer at 873. For example, the data associated with the source operand may indicate a number of cycles of a reference clock at 874, or a clock deadline value for a reference clock at 875.

Figure 10:
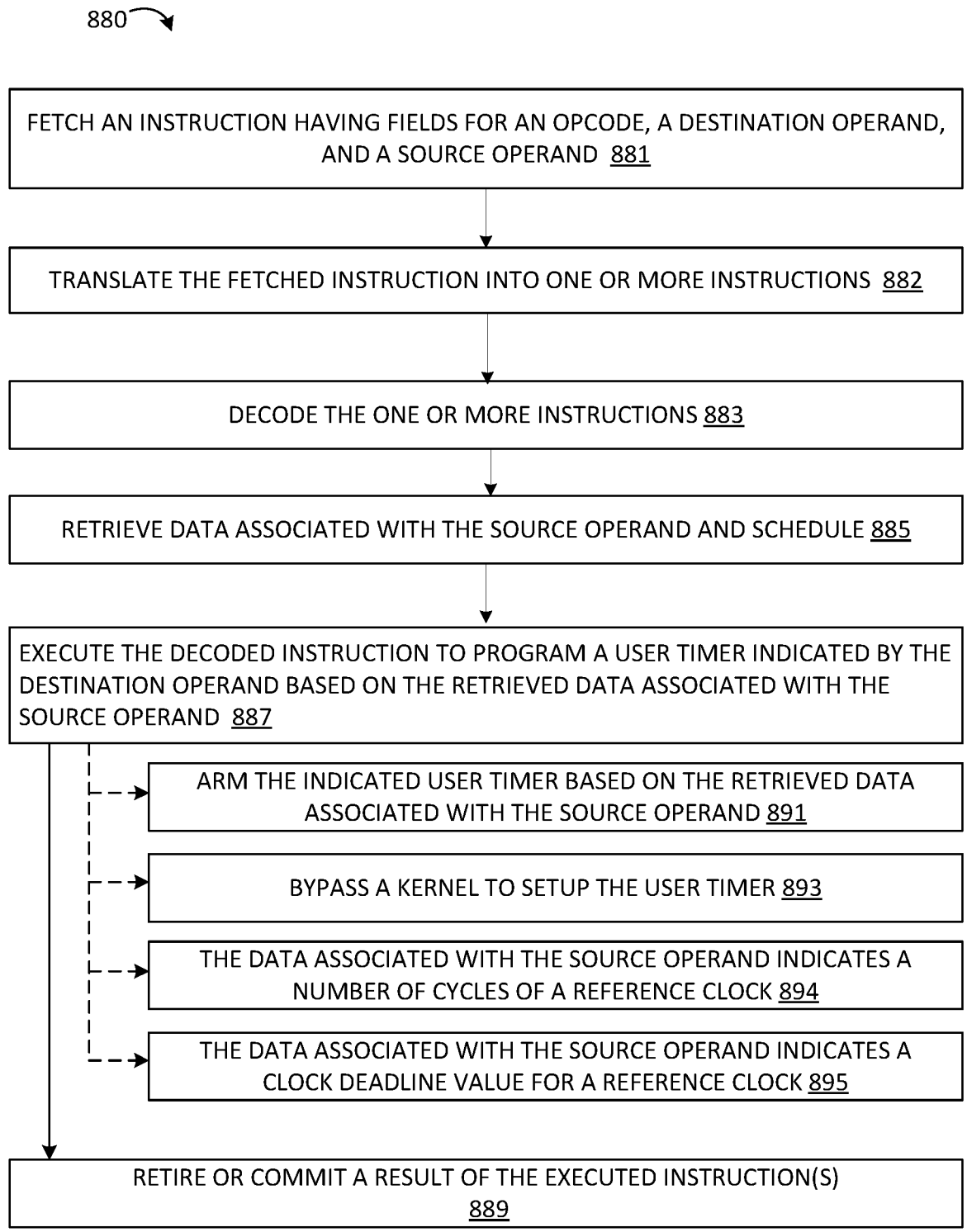
FIG. 10 is a flow diagram of another example of a method according to an embodiment.

FIG. 10 illustrates an embodiment of method 880 performed by a processor to process a user timer instruction using emulation or binary translation. For example, a processor core as shown in FIG. 11B, a pipeline as detailed below, etc. performs this method.

At 881, an instruction from a first instruction set is fetched. For example, a user timer instruction is fetched. The user timer instruction includes fields for an opcode, a destination operand for the target user timer, and a source operand for a user timer control data structure. In some embodiments, the instruction further includes a field for a writemask. In some embodiments, the instruction is fetched from an instruction cache. The source operands and destination operand are packed data. The opcode of the user timer instruction indicates which user timer operation (e.g., write timer register, read timer register, etc.) to perform.

The fetched instruction of the first instruction set is translated into one or more instructions of a second instruction set at 882.

The one or more translated instructions of the second instruction set are decoded at 883. In some embodiments, the translation and decoding are merged.

Data values associated with the source operands of the decoded instruction are retrieved at 885. For example, when one or more of the source operands are memory operands, the data from the indicated memory location is retrieved.

At 887, the decoded instruction(s) of the second instruction set is/are executed by execution circuitry (hardware) such as that detailed herein. For the WRTMR instruction, the execution will cause execution circuitry to program a user timer indicated by the destination operand based on the retrieved data associated with the source operand.

In some embodiments, the instruction is committed or retired at 889.

In some embodiments, the execution of the decoded WRTMR instruction will cause execution circuitry to arm the indicated user timer based on the retrieved data associated with the source operand at 891, and/or to bypass a kernel to setup the user timer at 893. For example, the data associated with the source operand may indicate a number of cycles of a reference clock at 894, or a clock deadline value for a reference clock at 895.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 11B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964. It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 13:
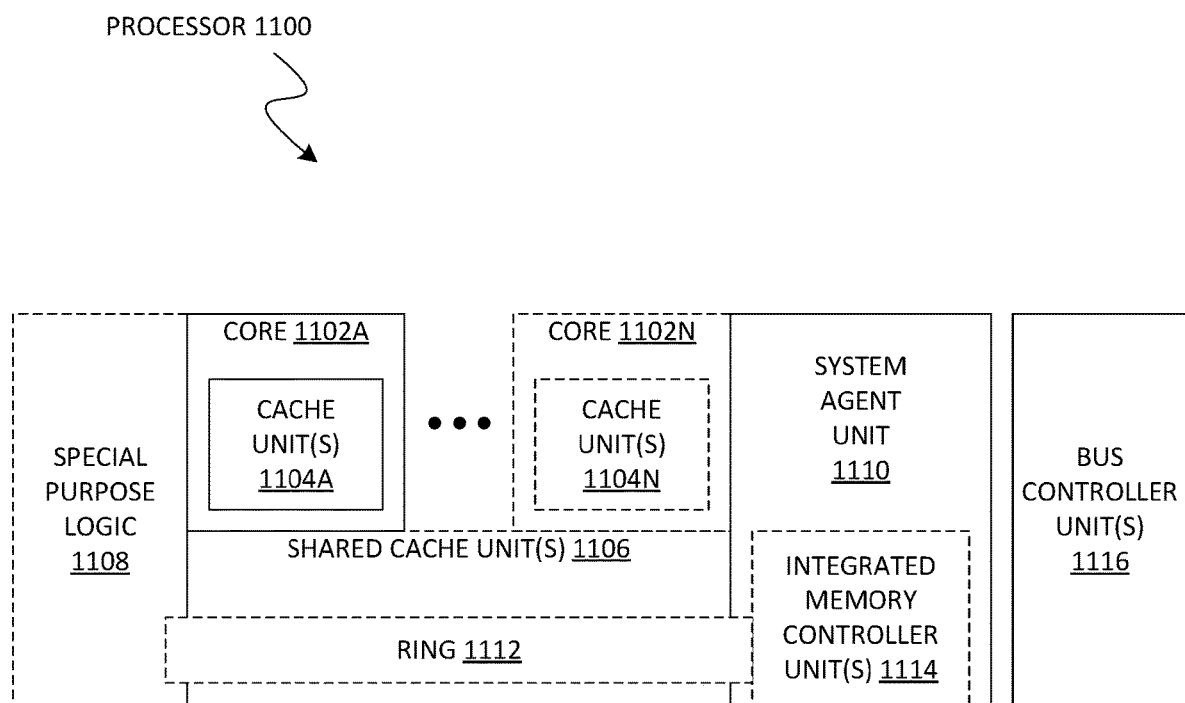
FIG. 13 is a block diagram of a processor that may have more than one core, may have an integrated memory controller, and may have integrated graphics according to embodiments of the invention.

FIG. 13 is a block diagram of a processor 1100 that may have more than one core, may have an integrated memory controller, and may have integrated graphics according to embodiments of the invention. The solid lined boxes in FIG. 13 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
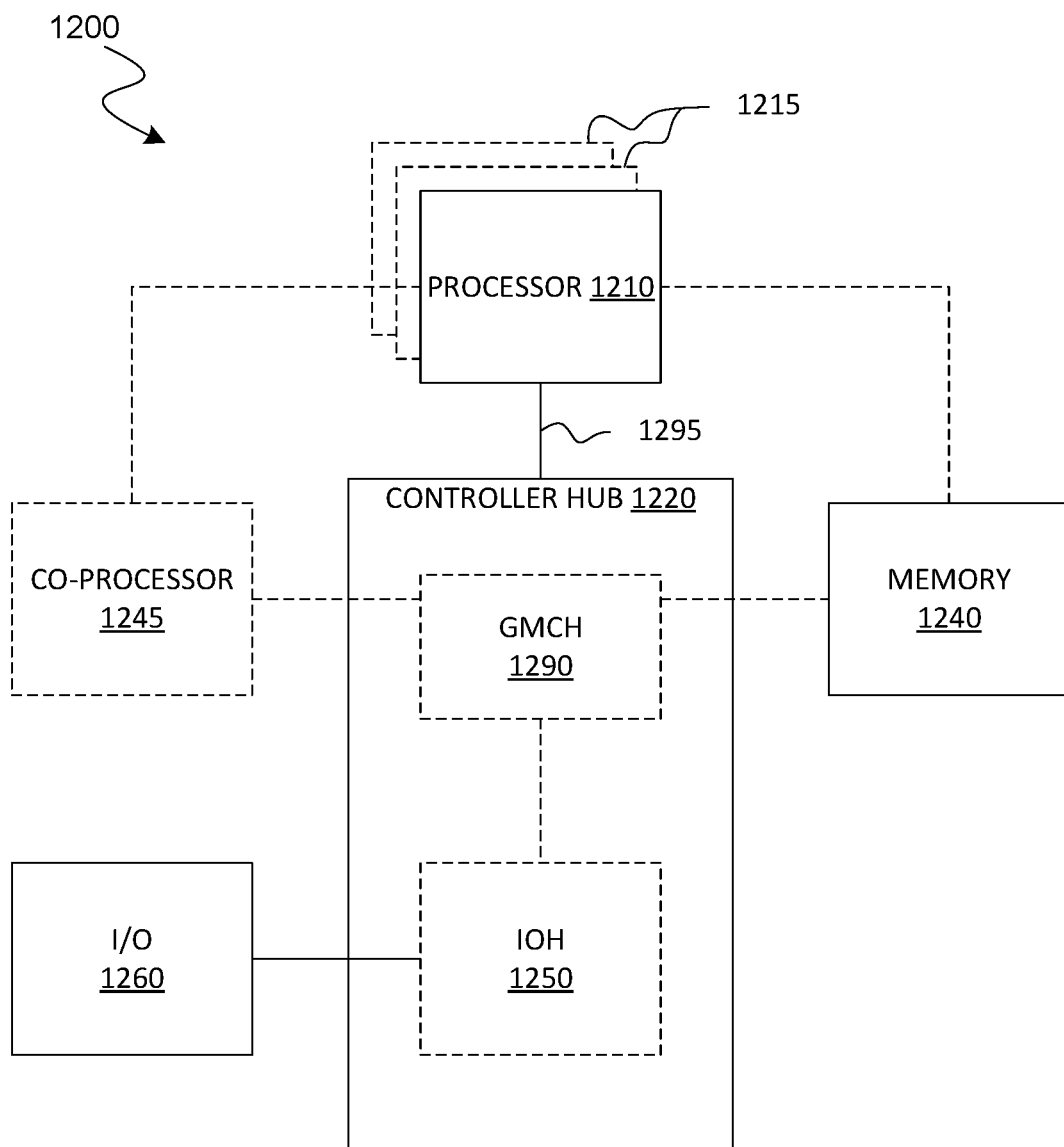
FIGS. 14-17 are block diagrams of exemplary computer architectures.

Referring now to FIG. 14, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 14 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor (s) 1245 accept and execute the received coprocessor instructions.

Figure 15:
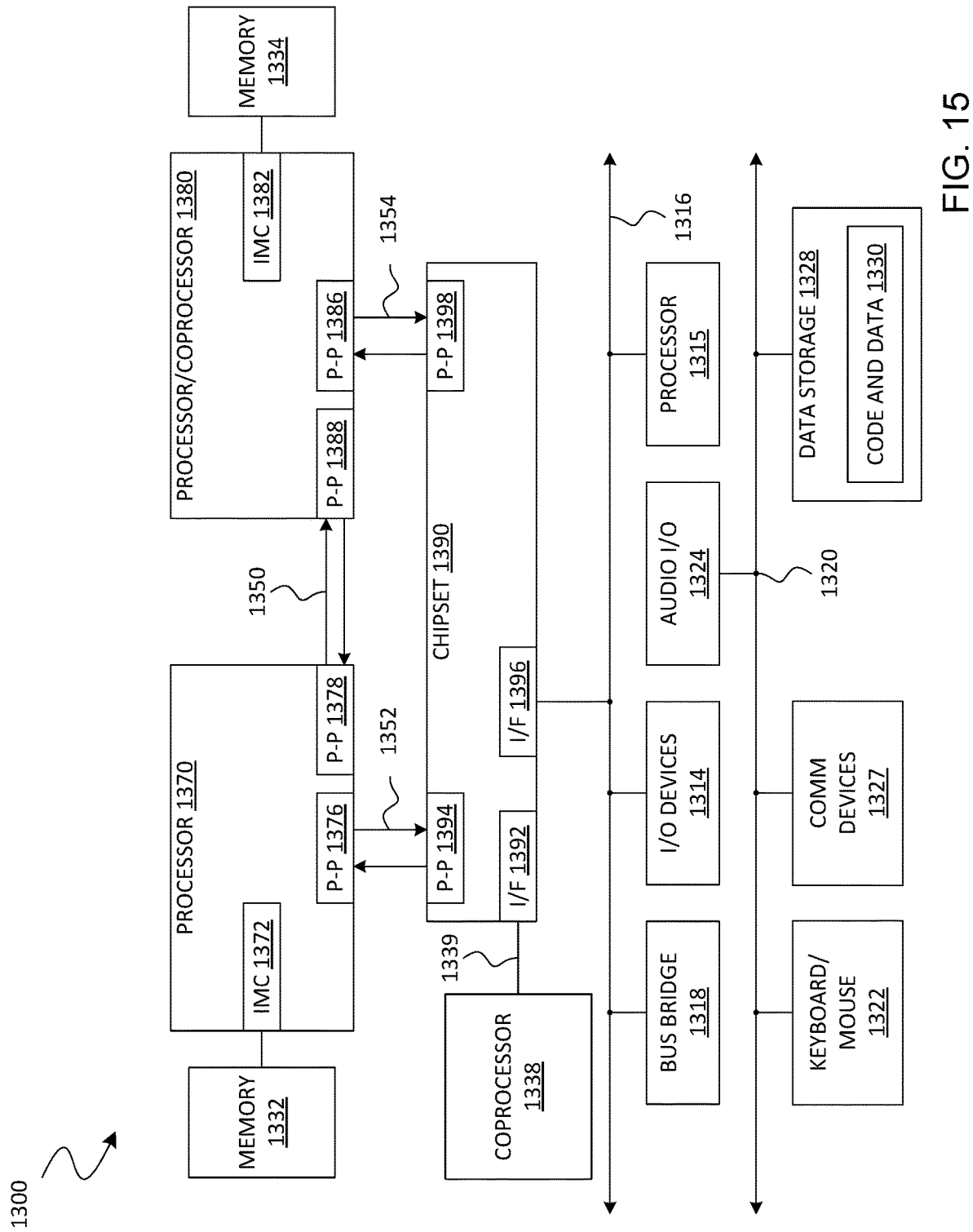

Referring now to FIG. 15, shown is a block diagram of a first more specific exemplary system 1300 in accordance with an embodiment of the present invention. As shown in FIG. 15, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 15, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 15, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 15, a system may implement a multi-drop bus or other such architecture.

Figure 16:
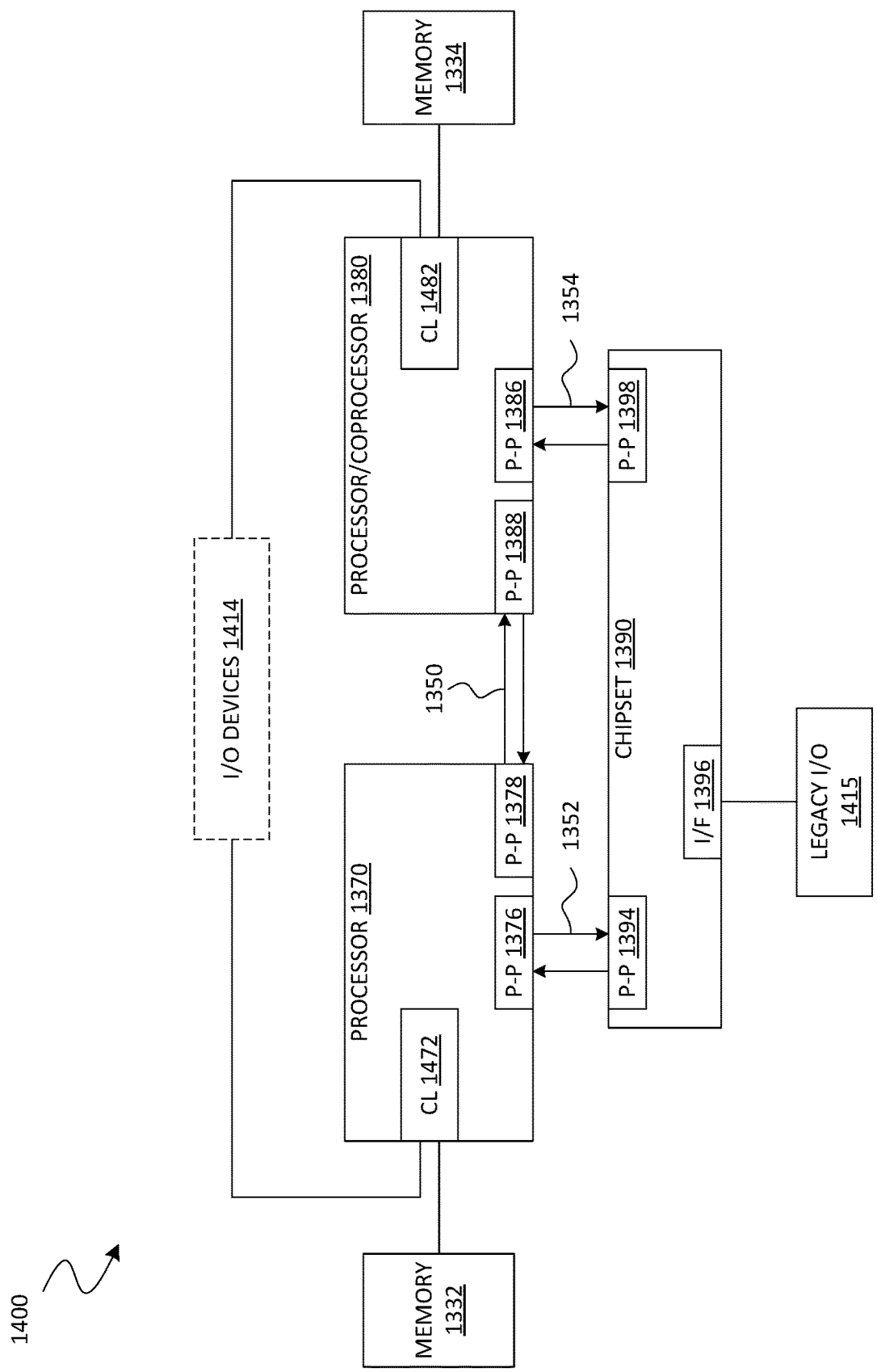

Referring now to FIG. 16, shown is a block diagram of a second more specific exemplary system 1400 in accordance with an embodiment of the present invention Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1370, 1380 may include integrated memory and I/O control logic ("CL") 1472 and 1482, respectively. Thus, the CL 1472, 1482 include integrated memory controller units and include I/O control logic. FIG. 16 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 17:
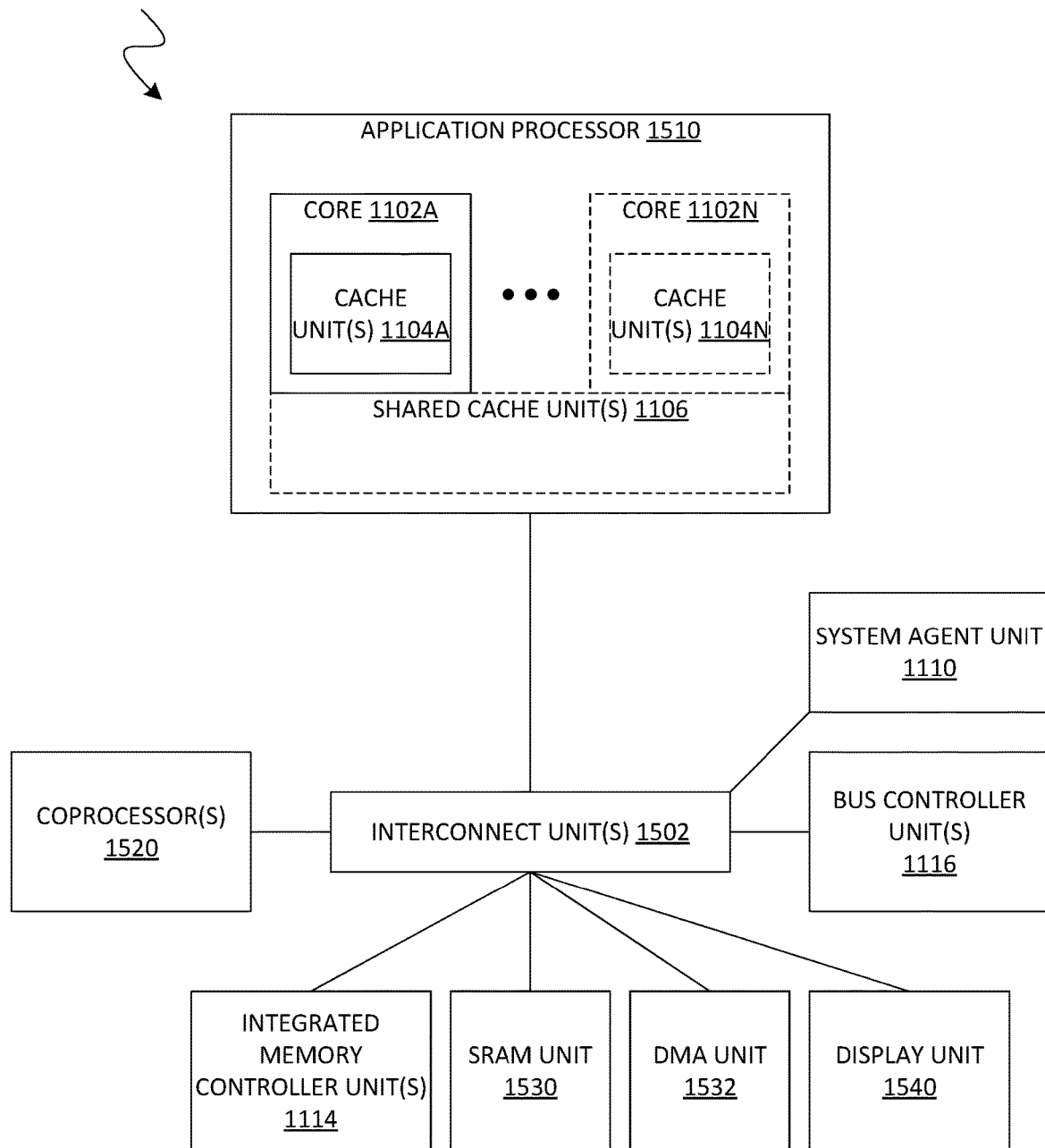

Referring now to FIG. 17, shown is a block diagram of a SoC 1500 in accordance with an embodiment of the present invention. Similar elements in FIG. 13 bear like reference numerals. Also, dashed lined boxes are optional features on more advanced SoCs. In FIG. 17, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
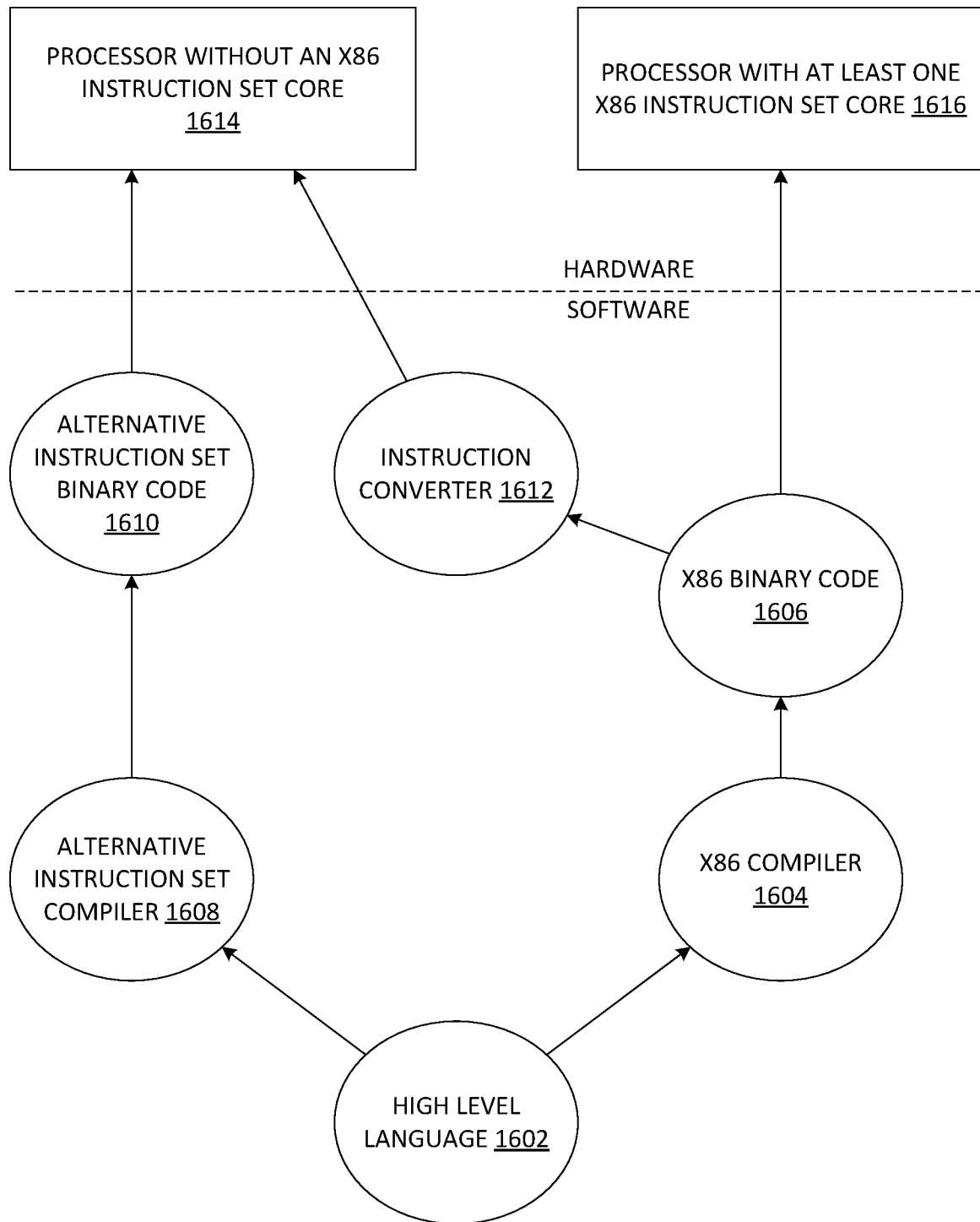
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 18 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Additional Notes and Examples

Example 1 includes an integrated circuit, comprising circuitry to retrieve timer program information provided directly from a user-level application, and program a user timer in hardware based on the retrieved timer program information.

Example 2 includes the integrated circuit of Example 1, wherein the circuitry is further to arm the user timer based on the retrieved timer program information.

Example 3 includes the integrated circuit of any of Examples 1 to 2, wherein the circuitry is further to schedule a user interrupt to deliver a user timer event directly to the user-level application.

Example 4 includes the integrated circuit of any of Examples 1 to 3, wherein the circuitry is further to bypass a kernel to setup the user timer, and bypass the kernel to deliver a user timer event to the user-level application.

Example 5 includes the integrated circuit of any of Examples 1 to 4, further comprising memory communicatively coupled to the circuitry to store the timer program information for the user timer.

Example 6 includes the integrated circuit of Example 5, wherein the memory comprises a register.

Example 7 includes the integrated circuit of any of Examples 5 to 6, wherein the timer program information indicates a desired amount of time delay.

Example 8 includes the integrated circuit of any of Examples 5 to 6, wherein the timer program information indicates a desired time deadline.

Example 9 includes the integrated circuit of any of Examples 5 to 8, wherein the circuitry is further to arm the user timer based on the timer program information stored in the memory, determine if a programmed time is reached for the user timer, and, if so determined, pend a user timer event for the user timer.

Example 10 includes the integrated circuit of Example 9, wherein the circuitry is further to schedule a user interrupt with a user timer vector to deliver the user timer event to the user-level application.

Example 11 includes a method, comprising retrieving timer program information provided directly from a user-level application, and programming a user timer in hardware based on the retrieved timer program information.

Example 12 includes the method of Example 11, further comprising arming the user timer based on the retrieved timer program information.

Example 13 includes the method of any of Examples 11 to 12, further comprising scheduling a user interrupt to deliver a user timer event directly to the user-level application.

Example 14 includes the method of any of Examples 11 to 13, further comprising bypassing a kernel to setup the user timer, and bypassing the kernel to deliver a user timer event to the user-level application.

Example 15 includes the method of any of Examples 11 to 14, further comprising storing the timer program information for the user timer in a memory.

Example 16 includes the method of Example 15, wherein the memory comprises a register.

Example 17 includes the method of any of Examples 15 to 16, wherein the timer program information indicates a desired amount of time delay.

Example 18 includes the method of any of Examples 15 to 16, wherein the timer program information indicates a desired time deadline.

Example 19 includes the method of any of Examples 15 to 18, further comprising arming the user timer based on the timer program information stored in the memory, determining if a programmed time is reached for the user timer, and, if so determined, pending a user timer event for the user timer.

Example 20 includes the method of Example 19, further comprising scheduling a user interrupt with a user timer vector to deliver the user timer event to the user-level application.

Example 21 includes an apparatus, comprising a processor, memory communicatively coupled to the processor to store timer program information provided directly from a user-level application, and circuitry communicatively coupled to the processor and the memory, the circuitry to retrieve the timer program information from the memory, and program a user timer in hardware based on the retrieved timer program information.

Example 22 includes the apparatus of Example 21, wherein the circuitry is further to arm the user timer based on the retrieved timer program information.

Example 23 includes the apparatus of any of Examples 21 to 22, wherein the circuitry is further to schedule a user interrupt at the kernel-level to deliver a user timer event directly to the user-level application.

Example 24 includes the apparatus of any of Examples 21 to 23, wherein the circuitry is further to bypass a kernel to setup the user timer, and bypass the kernel to deliver a user timer event to the user-level application.

Example 25 includes the apparatus of any of Examples 21 to 24, further comprising a hardware timer for use as a reference for the user timer.

Example 26 includes the apparatus of Example 25, wherein the hardware timer comprises a reference clock.

Example 27 includes the apparatus of Example 26, wherein the timer program information indicates a number of cycles of the reference clock.

Example 28 includes the apparatus of Example 26, wherein the timer program information indicates a clock deadline value for the reference clock.

Example 29 includes the apparatus of Example 28, wherein the circuitry is further to arm the user timer based on the clock deadline value stored in the memory, determine if the reference clock reached the clock deadline value, and, if so determined, pend a user timer event for the user timer.

Example 30 includes the apparatus of Example 29, wherein the circuitry is further to schedule a user interrupt with a user timer vector to deliver the user timer event to the user-level application.

Example 31 includes a system, comprising a memory to store a user timer control data structure associated with a user-level application, and a processor core communicatively coupled to the memory to program a user timer based on a time value stored in the user timer control data structure, determine if a reference clock has reached a user timer value, and, if so determined, set an indication that the user timer event is pending for the user timer.

Example 32 includes the system of Example 31, wherein the memory comprises a register to store the user timer control data structure.

Example 33 includes the system of any of Examples 31 to 32, wherein the processor core is further to decode a user deadline and a user timer vector from the user timer control data structure.

Example 34 includes the system of Example 33, wherein the processor core is further to schedule a user interrupt to deliver the user timer event to the user-level application.

Example 35. The system of Example 34, wherein the processor core is further to set a bit in a bitmap of user interrupts currently requesting service that corresponds to the user timer vector, and set a user deadline for the user interrupt to zero.

Example 36 includes the system of any of Examples 31 to 35, further comprising a hardware clock for use as the reference clock for the user timer.

Example 37 includes the system of Example 36, wherein the hardware timer comprises a reference clock.

Example 38 includes the system of Example 37, wherein the processor core is further to set the indication that the user timer event is pending for the user timer when a number of cycles of the reference clock that have elapsed after the user timer is programmed corresponds to the time value stored in the user timer control data structure.

Example 39 includes the system of Example 37, wherein the processor core is further to set the indication that the user timer event is pending for the user timer after the reference clock reaches a clock value that corresponds to the time value stored in the user timer control data structure.

Example 40 includes an apparatus comprising decode circuitry to decode a single instruction, the single instruction to include a field for an identifier of a first source operand, a field for an identifier of a destination operand, and a field for an opcode, the opcode to indicate execution circuitry is to program a user timer, and execution circuitry to execute the decoded instruction according to the opcode to retrieve timer program information from a location indicated by the first source operand, and program a user timer indicated by the destination operand based on the retrieved timer program information.

Example 41 includes the apparatus of Example 40, wherein the execution circuitry is further to execute the decoded instruction according to the opcode to arm the indicated user timer based on the retrieved timer program information.

Example 42 includes the apparatus of any of Examples 40 to 41, wherein the execution circuitry is further to execute the decoded instruction according to the opcode to bypass a kernel to setup the user timer.

Example 43 includes the apparatus of any of Examples 40 to 42, further comprising a hardware timer for use as a reference for the indicated user timer.

Example 44 includes the apparatus of Example 43, wherein the hardware timer comprises a reference clock.

Example 45 includes the apparatus of Example 44, wherein the timer program information indicates a number of cycles of the reference clock.

Example 46 includes the apparatus of Example 44, wherein the timer program information indicates a clock deadline value for the reference clock.

Example 47 includes a method, comprising fetching an instruction having fields for an opcode, a destination operand, and a source operand, decoding the instruction, retrieving data associated with the source operand, scheduling execution of the instruction, and executing the decoded instruction to program a user timer indicated by the destination operand based on the retrieved data associated with the source operand.

Example 48 includes the method of Example 47, further comprising arming the indicated user timer based on the retrieved data associated with the source operand.

Example 49 includes the method of any of Examples 47 to 48, further comprising bypassing a kernel to setup the user timer.

Example 50 includes the method of any of Examples 47 to 49, wherein the data associated with the source operand indicates a number of cycles of a reference clock.

Example 51 includes the method of any of Examples 47 to 49, wherein the data associated with the source operand indicates a clock deadline value for a reference clock.

Example 52 includes an apparatus, comprising means for fetching an instruction having fields for an opcode, a destination operand, and a source operand, means for decoding the instruction, means for retrieving data associated with the source operand, means for scheduling execution of the instruction, and means for executing the decoded instruction to program a user timer indicated by the destination operand based on the retrieved data associated with the source operand.

Example 53 includes the apparatus of Example 52, further comprising means for arming the indicated user timer based on the retrieved data associated with the source operand.

Example 54 includes the apparatus of any of Examples 52 to 53, further comprising means for bypassing a kernel to setup the user timer.

Example 55 includes the apparatus of any of Examples 52 to 54, wherein the data associated with the source operand indicates a number of cycles of a reference clock.

Example 56 includes the apparatus of any of Examples 52 to 55, wherein the data associated with the source operand indicates a clock deadline value for a reference clock.

Example 57 includes an apparatus, comprising means for retrieving timer program information provided directly from a user-level application, and means for programming a user timer in hardware based on the retrieved timer program information.

Example 58 includes the apparatus of Example 57, further comprising means for arming the user timer based on the retrieved timer program information.

Example 59 includes the apparatus of any of Examples 57 to 58, further comprising means for scheduling a user interrupt to deliver a user timer event directly to the user-level application.

Example 60 includes the apparatus of any of Examples 57 to 59, further comprising means for bypassing a kernel to setup the user timer, and means for bypassing the kernel to deliver a user timer event to the user-level application.

Example 61 includes the apparatus of any of Examples 57 to 60, further comprising means for storing the timer program information for the user timer in a memory.

Example 62 includes the apparatus of Example 61, wherein the memory comprises a register.

Example 63 includes the apparatus of any of Examples 61 to 62, wherein the timer program information indicates a desired amount of time delay.

Example 64 includes the apparatus of any of Examples 61 to 62, wherein the timer program information indicates a desired time deadline.

Example 65 includes the apparatus of any of Examples 61 to 64, further comprising means for arming the user timer based on the timer program information stored in the memory, means for determining if a programmed time is reached for the user timer, and, if so determined, means for pending a user timer event for the user timer.

Example 66 includes the apparatus of Example 65, further comprising means for scheduling a user interrupt with a user timer vector to deliver the user timer event to the user-level application.

Techniques and architectures for a user timer programmed directly by an application are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A system, comprising:
a memory to store a user timer control data structure associated with a user-level application; and
a processor core communicatively coupled to the memory to:
program a user timer based on a time value stored in the user timer control data structure; and
determine if a reference clock has reached a user timer value, and, if so determined,
set an indication that a user timer event is pending for the user timer.

2. The system of claim 1, wherein the memory comprises a register to store the user timer control data structure.

3. The system of claim 1, wherein the processor core is further to:
decode a user deadline and a user timer vector from the user timer control data structure.

4. The system of claim 3, wherein the processor core is further to:
schedule a user interrupt to deliver the user timer event to the user-level application.

5. The system of claim 4, wherein the processor core is further to:
set a bit in a bitmap of user interrupts currently requesting service that corresponds to the user timer vector; and
set a user deadline for the user interrupt to zero.

6. The system of claim 1, further comprising:
a hardware clock for use as a reference clock for the user timer.

7. The system of claim 6, wherein the hardware clock comprises a reference clock.

8. The system of claim 7, wherein the processor core is further to:
set the indication that the user timer event is pending for the user timer when a number of cycles of the reference clock that have elapsed after the user timer is programmed corresponds to the time value stored in the user timer control data structure.

9. The system of claim 7, wherein the processor core is further to:
set the indication that the user timer event is pending for the user timer after the reference clock reaches a clock value that corresponds to the time value stored in the user timer control data structure.

10. An apparatus comprising:
decode circuitry to decode a single instruction, the single instruction to include a field for an identifier of a first source operand, a field for an identifier of a destination operand, and a field for an opcode, the opcode to indicate execution circuitry is to program a user timer; and
execution circuitry to execute the decoded instruction according to the opcode to retrieve timer program information from a location indicated by the first source operand, and program the user timer indicated by the destination operand based on the retrieved timer program information.

11. The apparatus of claim 10, wherein the execution circuitry is further to execute the decoded instruction according to the opcode to:
arm the indicated user timer based on the retrieved timer program information.

12. The apparatus of claim 10, wherein the execution circuitry is further to execute the decoded instruction according to the opcode to:
bypass a kernel to setup the user timer.

13. The apparatus of claim 10, further comprising:
a hardware timer for use as a reference for the indicated user timer.

14. The apparatus of claim 13, wherein the hardware timer comprises a reference clock.

15. The apparatus of claim 14, wherein the timer program information indicates a number of cycles of the reference clock.

16. The apparatus of claim 14, wherein the timer program information indicates a clock deadline value for the reference clock.

17. A method, comprising:
fetching an instruction having fields for an opcode, a destination operand, and a source operand;
decoding the instruction;
retrieving data associated with the source operand;
scheduling execution of the instruction; and
executing the decoded instruction to program a user timer indicated by the destination operand based on the retrieved data associated with the source operand.

18. The method of claim 17, further comprising:
arming the indicated user timer based on the retrieved data associated with the source operand.

19. The method of claim 17, further comprising:
bypassing a kernel to setup the user timer.

20. The method of claim 17, wherein the data associated with the source operand indicates a number of cycles of a reference clock.

21. The method of claim 17, wherein the data associated with the source operand indicates a clock deadline value for a reference clock.

* * * * *